US011646860B2

(12) United States Patent
Gulati et al.

(10) Patent No.: US 11,646,860 B2
(45) Date of Patent: May 9, 2023

(54) CLUTTER INTERFERENCE MANAGEMENT

(71) Applicant: QUALCOMM Incorporated, San Diego, CA (US)

(72) Inventors: Kapil Gulati, Belle Mead, NJ (US); Navid Abedini, Basking Ridge, NJ (US); Andrzej Partyka, Bedminster, NJ (US); Vasanthan Raghavan, West Windsor Township, NJ (US); Junyi Li, Fairless Hills, PA (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/644,811

(22) Filed: Dec. 17, 2021

(65) Prior Publication Data

US 2022/0116194 A1 Apr. 14, 2022

Related U.S. Application Data

(62) Division of application No. 17/248,189, filed on Jan. 13, 2021.

(Continued)

(51) Int. Cl.
*H04L 5/14* (2006.01)

(52) U.S. Cl.
CPC ............ *H04L 5/1438* (2013.01); *H04L 5/143* (2013.01)

(58) Field of Classification Search
CPC ........... H04W 56/0045; H04W 56/001; H04W 56/005; H04W 36/20; H04L 5/1461;

(Continued)

(56) References Cited

U.S. PATENT DOCUMENTS

2015/0327196 A1* 11/2015 Blankenship ..... H04W 56/0045 370/281
2016/0233903 A1* 8/2016 Wu ......................... H04L 69/22

(Continued)

FOREIGN PATENT DOCUMENTS

EP 2019509 A1 1/2009
EP 3567760 A1 11/2019

OTHER PUBLICATIONS

International Search Report and Written Opinion—PCT/US2021/070039—ISA/EPO—dated Jul. 8, 2021.

(Continued)

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a base station may determine, for full-duplex mode communication on a first link and a second link, a timing adjustment to at least one of a first timing or a second timing, wherein the timing adjustment is to cause a delay between clutter reflection from a first signal and an occurrence of a second signal to occur during a cyclic prefix of the second signal; cause the timing adjustment to be applied to the at least one of the first timing or the second timing; and communicate in the full-duplex mode with a first node and a second node in accordance with the timing adjustment, wherein communicating includes transmitting the first signal to the first node and receiving the second signal from the second node. Numerous other aspects are provided.

30 Claims, 8 Drawing Sheets

Related U.S. Application Data

(60) Provisional application No. 62/968,652, filed on Jan. 31, 2020.

(58) Field of Classification Search
CPC ... H04L 27/2646; H04L 5/1438; H04L 5/143; H04L 5/14
See application file for complete search history.

(56) References Cited

U.S. PATENT DOCUMENTS

| | | | |
|---|---|---|---|
| 2018/0069688 | A1* | 3/2018 | Arregui De La Cruz .................. H04B 17/364 |
| 2019/0191399 | A1 | 6/2019 | Islam et al. |
| 2020/0413413 | A1 | 12/2020 | Haghighat et al. |
| 2021/0152409 | A1 | 5/2021 | Pan et al. |
| 2021/0243002 | A1 | 8/2021 | Gulati |
| 2022/0007304 | A1 | 1/2022 | Haghighat et al. |

OTHER PUBLICATIONS

Partial International Search REPORT-PCT/US2021/070039—ISA/EPO—dated May 17, 2021.

* cited by examiner

CLUTTER INTERFERENCE MANAGEMENT

CROSS-REFERENCE TO RELATED APPLICATIONS

This application is a divisional of U.S. patent application Ser. No. 17/248,189, filed Jan. 13, 2021, entitled "CLUTTER INTERFERENCE MANAGEMENT," which claims priority to U.S. Provisional Patent Application No. 62/968,652, filed on Jan. 31, 2020, entitled "CLUTTER INTERFERENCE MANAGEMENT," the contents of which are incorporated herein by reference in their entireties.

FIELD OF THE DISCLOSURE

Aspects of the present disclosure generally relate to wireless communication and to techniques and apparatuses for clutter interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; causing the timing adjustment to be applied to the at least one of the first timing or the second timing; and communicating in the full-duplex mode with a first node and a second node in accordance with the timing adjustment based at least in part on causing the timing adjustment to be applied, wherein communicating includes transmitting the first signal to the first node and receiving the second signal from the second node.

In some aspects, a method of wireless communication, performed by a wireless communication device, may include determining, for full-duplex mode communication with a first node and a second node, a first multiple access (MA) signature for the first node and a second MA signature for the second node, wherein the first MA signature and the second MA signature are selected to suppress residual clutter interference; and communicating in the full-duplex mode with the first node using the first MA and the second node using the second MA.

In some aspects, a wireless communication device for wireless communication may include a memory and one or more processors operatively coupled to the memory. The memory and the one or more processors may be configured to determine, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; cause the timing adjustment to be applied to the at least one of the first timing or the second timing; and communicate in the full-duplex mode with a first node and a second node in accordance with the timing adjustment based at least in part on causing the timing adjustment to be applied, wherein communicating includes transmitting the first signal to the first node and receiving the second signal from the second node.

In some aspects, a wireless communication device for wireless communication may include a memory and one or more processors operatively coupled to the memory. The memory and the one or more processors may be configured to determine, for full-duplex mode communication with a first node and a second node, a first MA signature for the first node and a second MA signature for the second node, wherein the first MA signature and the second MA signature are selected to suppress residual clutter interference; and communicate in the full-duplex mode with the first node using the first MA signature and with the second node using the second MA signature.

In some aspects, a non-transitory computer-readable medium may store one or more instructions for wireless communication. The one or more instructions, when executed by one or more processors of a wireless communication device, may cause the one or more processors to determine, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; cause the timing adjustment to be applied to the at least one of the first timing or the second timing; and communicate in the full-duplex mode with a first node and a second node in accordance with the timing adjustment based at least in part on causing the timing adjustment to be applied, wherein communicating includes transmitting the first signal to the first node and receiving the second signal from the second node.

In some aspects, a non-transitory computer-readable medium may store one or more instructions for wireless communication. The one or more instructions, when executed by one or more processors of a wireless communication device, may cause the one or more processors to determine, for full-duplex mode communication with a first node and a second node, a first MA signature for the first node and a second MA signature for the second node, wherein the first MA signature and the second MA signature are selected to suppress residual clutter interference; and communicate in the full-duplex mode with the first node using the first MA signature and with the second node using the second MA signature.

In some aspects, an apparatus for wireless communication may include means for determining, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; means for causing the timing adjustment to be applied to the at least one of the first timing or the second timing; and means for communicating in the full-duplex mode with a first node and a second node in accordance with the timing adjustment based at least in part on causing the timing adjustment to be applied, wherein communicating includes transmitting the first signal to the first node and receiving the second signal from the second node.

In some aspects, an apparatus for wireless communication may include means for determining, for full-duplex mode communication with a first node and a second node, a first MA signature for the first node and a second MA signature for the second node, wherein the first MA signature and the second MA signature are selected to suppress residual clutter interference; and means for communicating in the full-duplex mode with the first node using the first MA signature and with the second node using the second MA signature.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
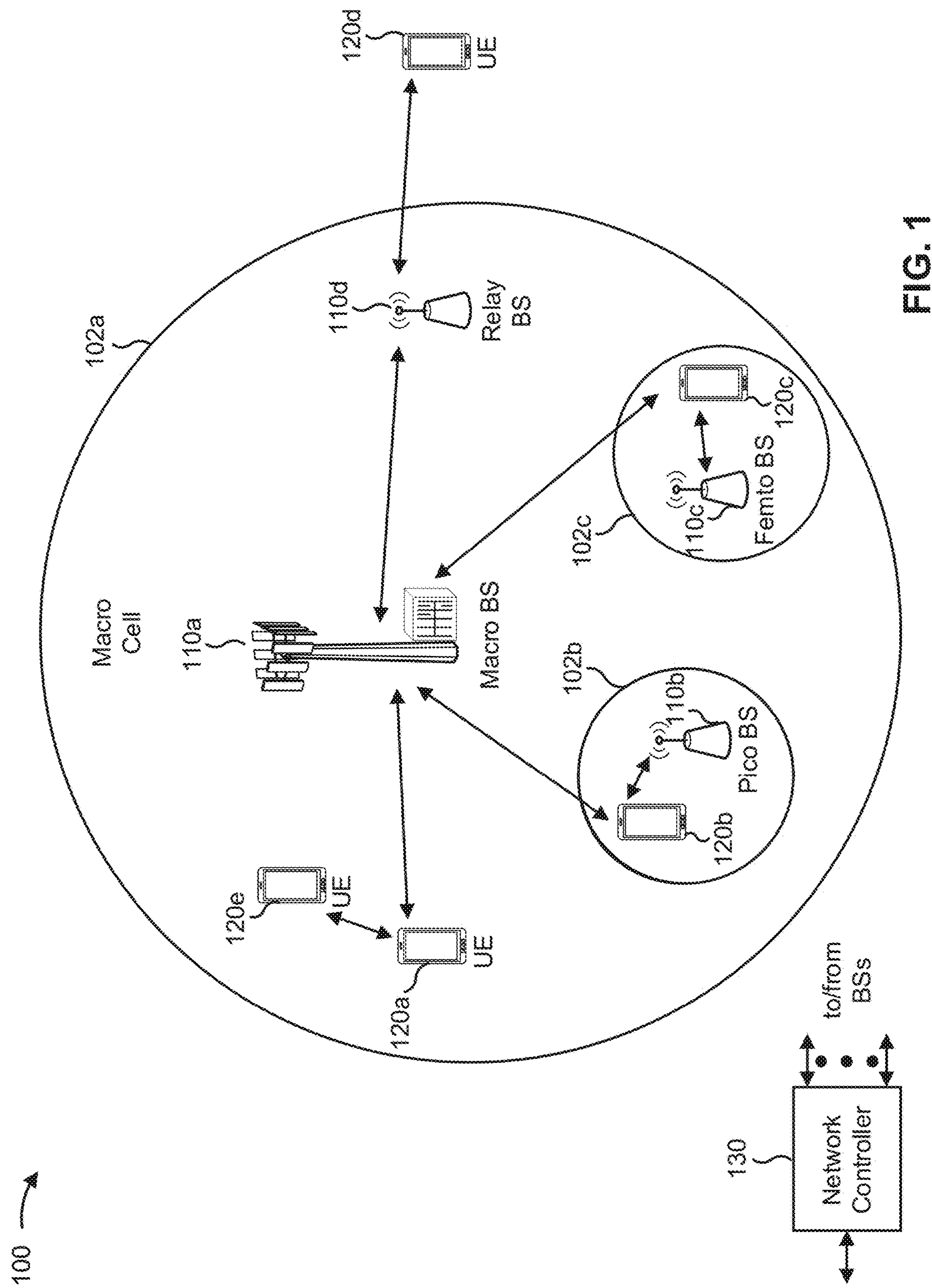
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
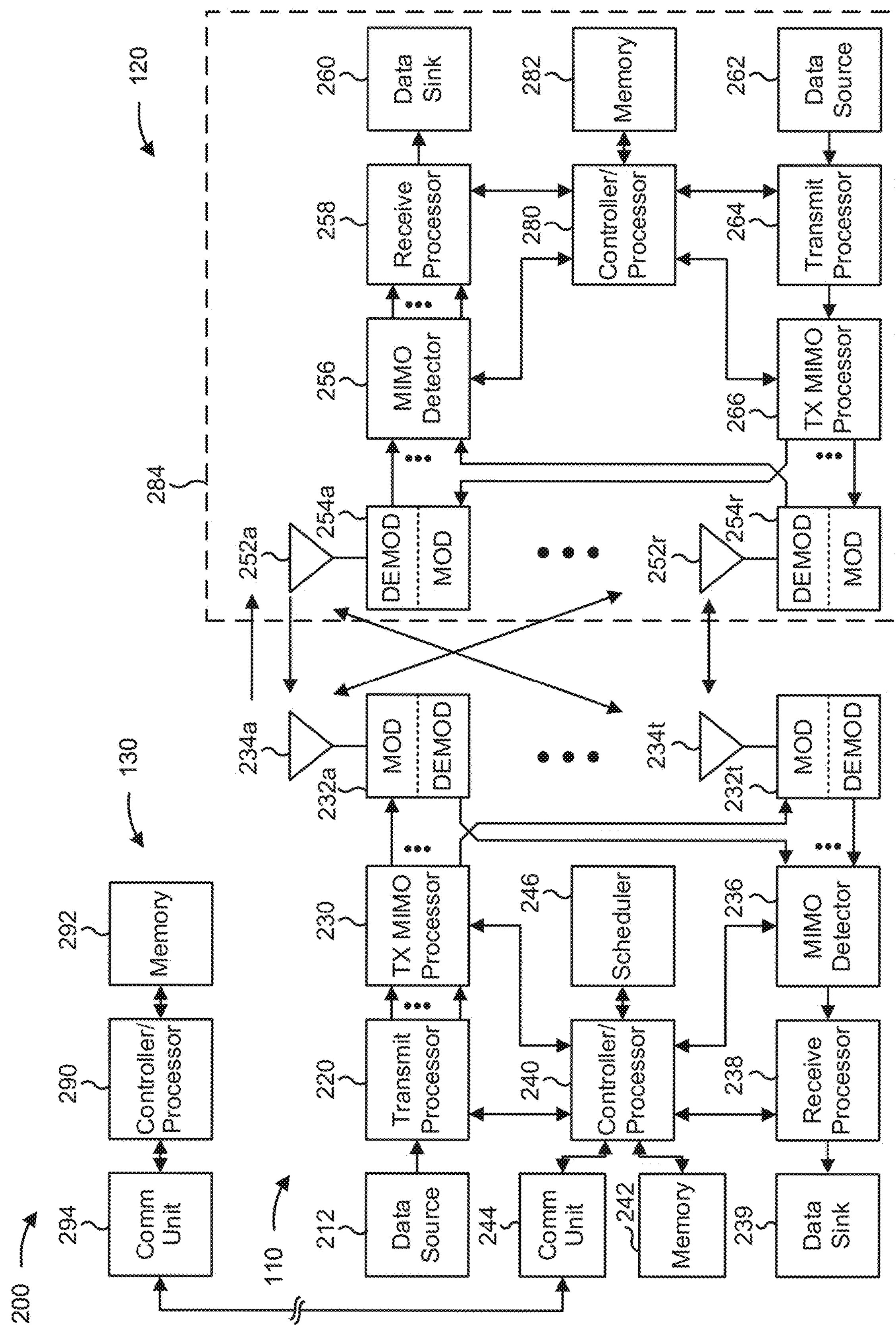
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with clutter interference mitigation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of base station 110 and/or UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, a wireless communication device (e.g., base station 110 or UE 120) may include means for determining, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor, means for causing the timing adjustment to be applied to the at least one of the first timing or the second timing, means for communicating in the full-duplex mode with a first node and a second node in accordance with the timing adjustment based at least in part on causing the timing adjustment to be applied, wherein communicating includes transmitting the first signal to the first node and receiving the second signal from the second node, and/or the like. In some aspects, base station 110 may include means for determining, for full-duplex mode communication with a first node and a second node, a first multiple access (MA) signature for the first node and a second MA signature for the second node, wherein the first MA signature and the second MA signature are selected to suppress residual clutter interference, means for communicating in the full-duplex mode with the first node using the first MA signature and with the second node using the second MA signature, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like As indicated above, FIG. 2 is provided as an example. Other examples may differ from what is described with regard to FIG. 2.

In some communications systems, a wireless communication device, such as a BS or a UE, may be configured to operate in a full-duplex mode. For example, a wireless communication device may concurrently transmit a first signal to a first UE and receive a second signal from a second UE. Full-duplex mode communication enables the wireless communication device to achieve increased throughput and spectral efficiency relative to half-duplex operation. However, full-duplex mode communication may also be associated with higher levels of self-interference (e.g., which may result in a reduced signal to interference and noise ratio (SINR)). Self-interference may result from reflected transmission signals interfering with reception, and may be termed clutter interference or clutter echo.

The wireless communication device may transmit a first signal toward a first node (e.g., a UE on an access link or a BS on a backhaul link), but the first signal may reflect off of a surrounding object, which may cause clutter echo when the first signal is reflected back toward the wireless communication device. In this case, the clutter echo may occur concurrently with the wireless communication device attempting to receive a signal from a second node (e.g., another UE or another BS), which may result in an interruption to communication with the second wireless node. Some of the clutter interference may be mitigated by beamforming to form nulls in a direction of an object causing the clutter echo. However, remaining residual clutter interference may still cause SINR to be less than a threshold for successful receipt of signaling from the second node.

Some aspects described herein may enable clutter interference mitigation. For example, a wireless communication device may adjust a timing alignment between a first signal that the wireless communication device is to transmit and a second signal that the wireless communication device is to receive, such that a delay between clutter echo from the first signal is within an adjusted cyclic prefix length (e.g., within a scaling factor of the cyclic prefix length) of the second signal. In this way, the wireless communication device may avoid inter-symbol interference and/or inter-carrier interference. Moreover, the wireless communication device may enable orthogonal demodulation reference signal (DMRS), or minimum mean square error interference rejection combining (MMSE-IRC), based interference mitigation based at least in part on causing the clutter echo to occur within the adjusted cyclic prefix length of the second signal.

In some aspects, the wireless communication device may use multiple access (MA) signatures to mitigate residual clutter inference. For example, alone or in combination with adjusting a timing alignment, the wireless communication device may cause the first signal and the second signal to have different MA signatures (e.g., different DMRS configurations), thereby enabling separable channel estimation for the first signal and the second signal. In this case, the wireless communication device reduces clutter interference, thereby improving SINR and reducing a likelihood of dropped communications.

Figure 3A:
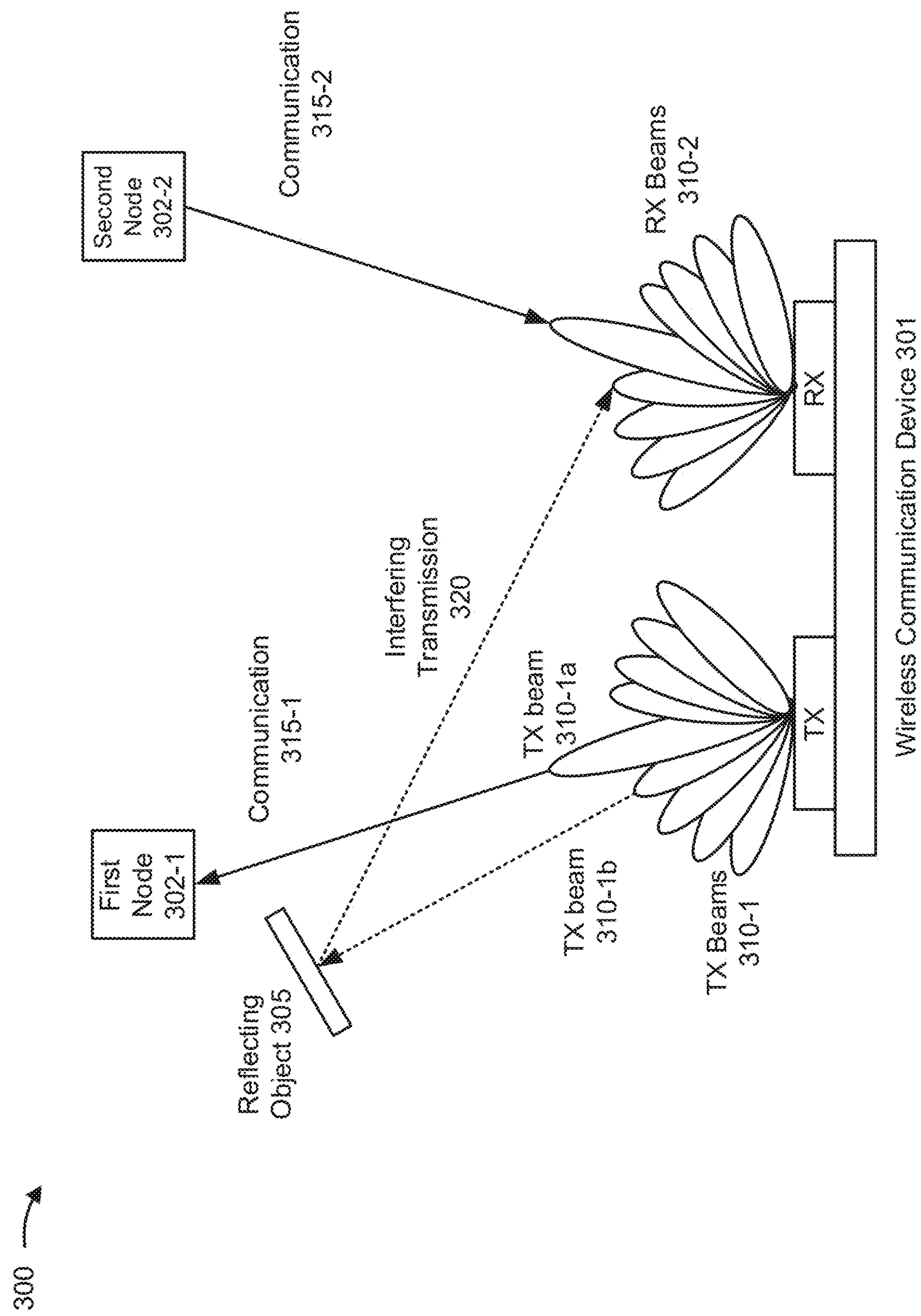
FIGS. 3A-3D are diagrams illustrating an example of clutter interference mitigation, in accordance with various aspects of the present disclosure.

FIGS. 3A-3D are diagrams illustrating an example 300 of clutter interference mitigation, in accordance with various aspects of the present disclosure. As shown in FIG. 3A, example 300 includes a wireless communication device 301 in communication with a set of nodes 302 (e.g., a first UE 120-1 and a second UE 120-2, a first BS 110-1 and a second BS 110-2, a combination thereof, and/or the like) in a full-duplex mode. In some aspects, a reflecting object 305 may be disposed at least partially in a transmission path of wireless communication device 301. For example, reflecting object 305 may be another node, a geographical feature, a building, and/or the like.

As further shown in FIG. 3A, wireless communication device 301 may include a transmitter (TX) associated with transmitting a first communication 315-1 using a plurality of TX beams 310-1 and a receiver (RX) associated with receiving a communication 315-2 using a plurality of RX beams 310-2. In this case, wireless communication device 301 may operate in a full-duplex mode, where wireless communication device 301 transmits TX beams 310-1 within a threshold proximity of (e.g., concurrently with) receiving RX beams 310-2. In some aspects, based at least in part on using a plurality of TX beams 310-1 for communication 315-1 (e.g., using beam sweeping), a beam **310-1*a* may be directed toward first node 302-1 and a beam 310-1*b* may reflect off reflecting object 305, resulting in interfering transmission 320. In this case, interfering transmission 320 may be a clutter echo caused by reflecting object 305**.

Figure 3B:
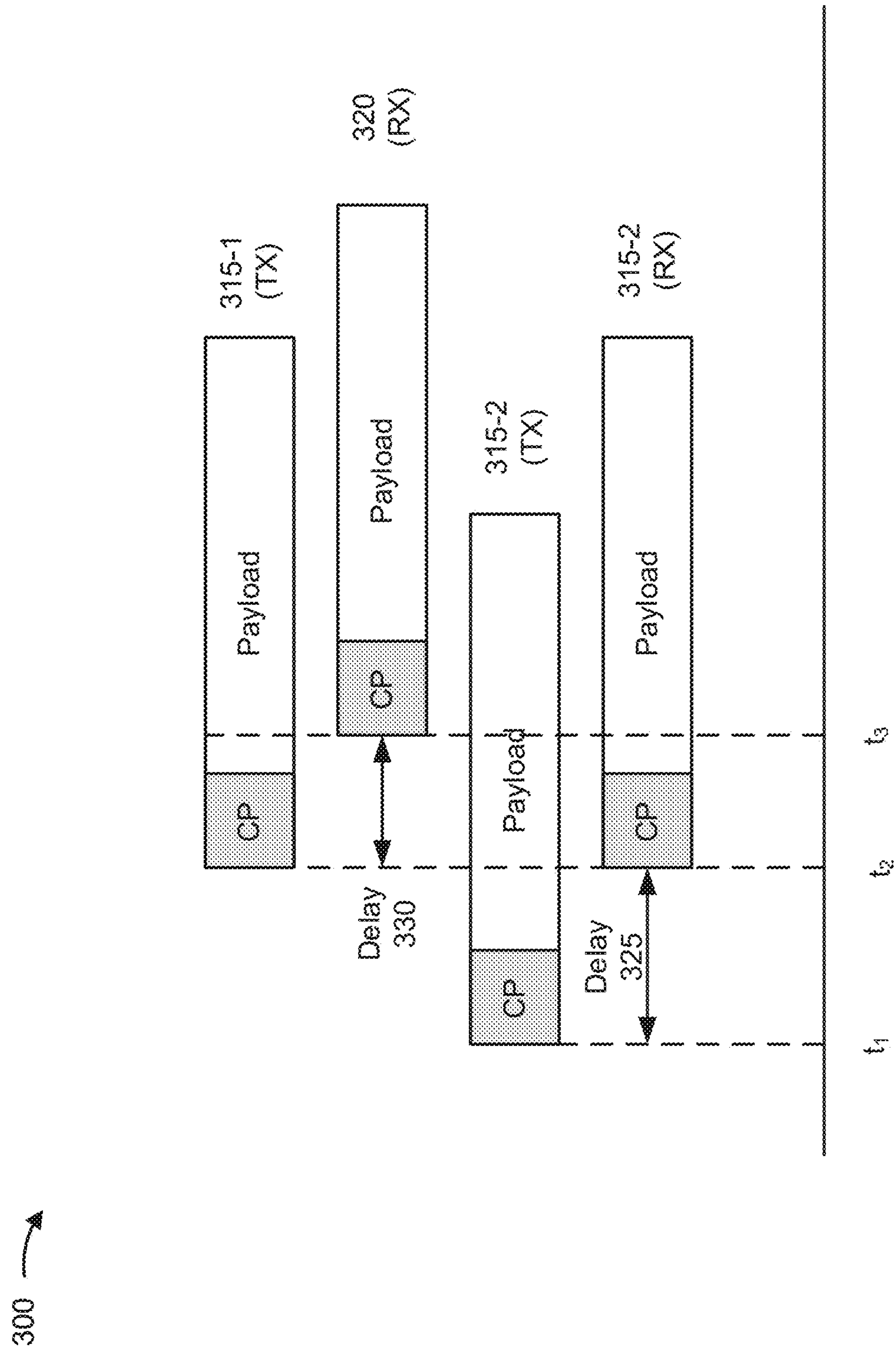

FIG. 3B shows an example of a timing alignment of the beams 310. For example, second node 302-2 may transmit communication 315-2 at a first time $t_1$. A delay 325 associated with communication 315-2 propagating toward wireless communication device 301 may result in wireless communication device 301 receiving communication 315-2 at a second time $t_2$. Similarly, wireless communication device 301 may transmit communication 315-1 toward first node 302-1 at the second time $t_2$. In this case, a delay 330 associated with beam **310-1*b* propagating toward reflecting object 305 and reflecting back, as interfering transmission 320, toward wireless communication device 301 may result in wireless communication device 301 receiving interfering transmission 320 at a third time $t_3$. In this case, wireless communication device 301 may start receiving interfering transmission 320 during a payload portion of communication 315-2**, which may result in clutter interference and an SINR of less than a threshold for successful communication.

Figure 3C:
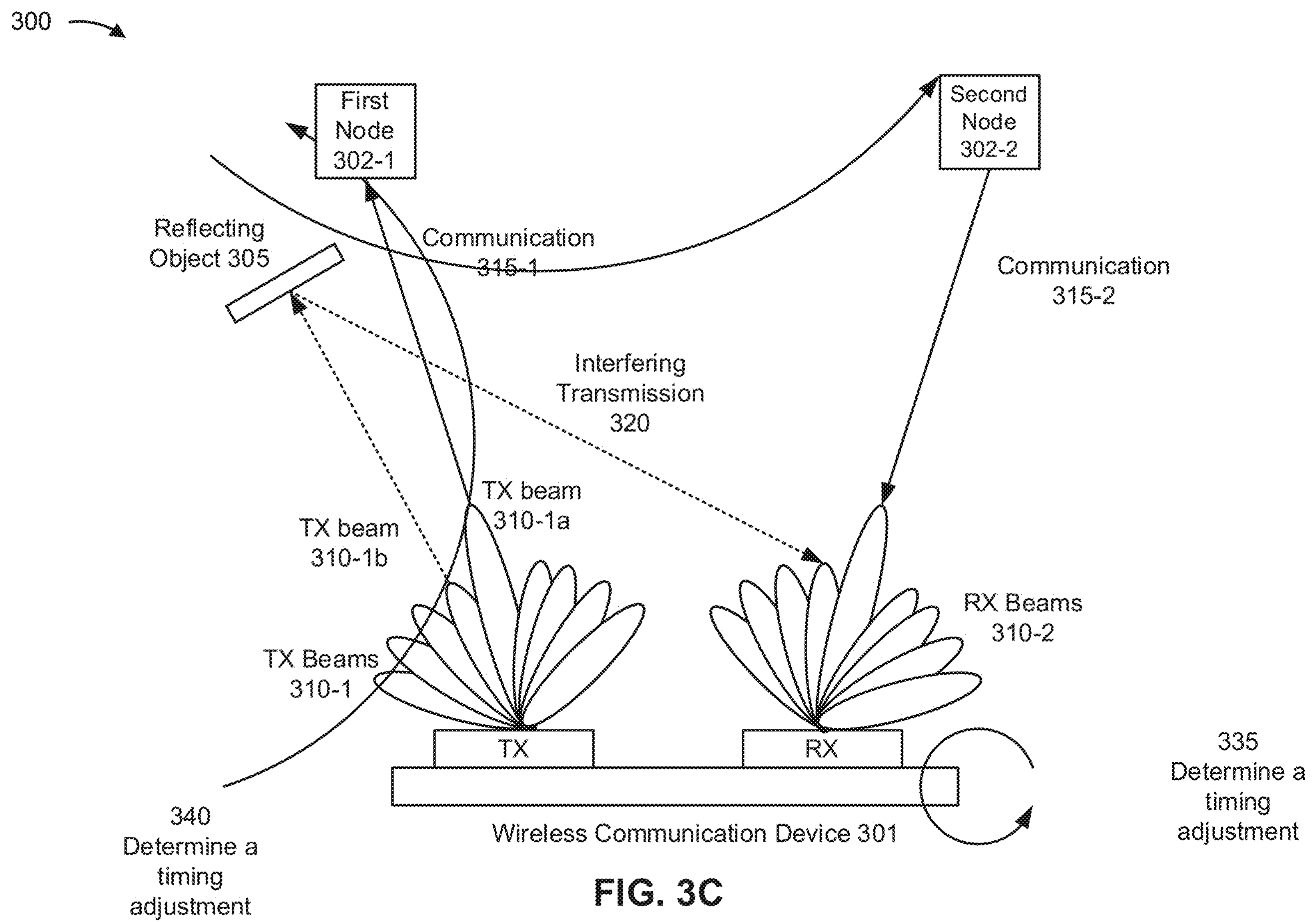

As shown in FIG. 3C, and by reference number 335, based at least in part on detecting clutter interference from receiving interfering transmission 320, wireless communication device 301 may determine a timing adjustment. For example, wireless communication device 301 may determine to adjust a timing of at least one of communication 315-1 or communication 315-2 to cause the delay between transmitting communication 315-1 and receiving interfering transmission 320 to occur within an adjusted cyclic prefix (CP) length of communication 315-2. In some aspects, the adjusted cyclic prefix length may be based at least in part on the cyclic prefix length multiplied by a scaling factor. In some aspects, the scaling factor is less than or equal to 1. Additionally, or alternatively, the scaling factor may be based at least in part on a modulation and coding scheme of, for example, communication 315-2. In this way, wireless communication device 301 avoids inter-symbol interference and/or inter-carrier interference and allows for orthogonal DMRS-based interference suppression or MMSE-IRC-based interference suppression.

In some aspects, wireless communication device 301 may determine to adjust the timing based at least in part on a particular type of channel measurement. For example, wireless communication device 301 may receive an indication of a measurement of a reference signal or synchronization signal block transmitted to first node 302-1. Additionally, or alternatively, wireless communication device 301 may perform a clutter interference measurement of the reference signal or synchronization signal block transmission at a time when second node 302-2 is not transmitting, to identify the clutter interference caused by interfering object 305. In some aspects, wireless communication device 301 may determine the timing adjustment based at least in part on a measurement of a reference signal or synchronization signal block transmission received from second node 302-2, to determine a level of SINR to achieve to successfully receive the reference signal or synchronization signal block.

In some aspects, wireless communication device 301 may determine to adjust the timing based at least in part on a capability of nodes 302. For example, wireless communication device 301 may determine whether nodes 302 are capable of full-duplex multiplexing (e.g., based at least in part on an SINR measurement, a clutter interference leakage, and/or the like), and may determine to adjust the timing based at least in part on determining that nodes 302 are capable of full-duplex mode operation.

In some aspects, wireless communication device 301 may determine a timing adjustment (TA) command and provide the TA command, as shown by reference number 340, to at least one of first node 302-1 or second node 302-2 to adjust a timing of at least one of communication 315-1 or communication 315-2. For example, when wireless communication device 301 is a gNB-type of BS connected to first node 302-1 on a downlink and second node 302-2 on an uplink, wireless communication device 301 may provide a TA command to second node 302-2 to cause a change to a timing of communication 315-2. In another example, when wireless communication device 301 is an IAB-node-type of BS receiving from a parent node (e.g., second node 302-2) and transmitting to a child node (e.g., first node 302-1), wireless communication device 301 may self-adjust a transmit time of communication 315-1. In this case, wireless communication device 301 may indicate to first node 302-1 that the transmit time of communication 315-1 is adjusted. In some aspects, wireless communication device 301 may adjust a transmit time of both communication 315-1 and communication 315-2.

In some aspects, wireless communication device 301 may report information relating to the timing adjustment to enable another device to determine whether to continue with full-duplex mode operation and/or to determine the timing adjustment. For example, wireless communication device 301 may report time delays 325 and/or 330 to a parent node (e.g., second node 302-2), and the parent node may provide an indication of the timing adjustment or an indication to cease using full-duplex mode operation. Additionally, or alternatively, wireless communication device 301 may report a clutter interference measurement to the parent node, and the parent node may provide the indication of the timing adjustment, or the indication to cease, using the full-duplex mode operation.

In some aspects, wireless communication device 301 may adjust another characteristic of communications 315-1 and/or 315-2 to mitigate clutter interference. For example, wireless communication device 301 may use different MA signatures for communications 315-1 and 315-2 to enable separable channel estimation. In this case, wireless communication device 301 may use a first DMRS for communication 315-1 and (may cause second node 302-2 to use) a second DMRS for communication 315-2. For example, the first DMRS and the second DMRS may be configured with the same time and frequency resources and base sequence, but different cyclic shifts. Alternatively, the first DMRS and the second DMRS may be configured with the same time and frequency resources, but different base sequences. Alternatively, the first DMRS and the second DMRS may be configured with different time and frequency resources. In this case, time and frequency resources of the first DMRS may be avoided for the second DMRS and time and frequency resources of the second DMRS may be avoided for the first DMRS, thereby enabling separable channel estimation.

In some aspects, wireless communication device 301 may use resource spread multiple access (RSMA) signatures for the communications 315 to enable mitigation of clutter interference. For example, wireless communication device 301 may configure an RSMA repetition factor to cause a particular MA signature length based at least in part on a clutter interference level measurement, a threshold SINR that is to be achieved, a threshold throughput that is to be achieved, and/or the like. In this case, wireless communication device 301 may determine an MA signature length, and may provide information identifying the MA signature length to nodes 302-1 and/or 302-2. Additionally, or alternatively, wireless communication device 301 may request that nodes 302-1 and/or 302-2 use the MA signature length and may receive confirmation indicating that nodes 302-1 and/or 302-2 are to use the MA signature length. Alternatively, wireless communication device 301 may provide a clutter interference measurement report to node 302-1 or 302-2 and may receive a response identifying an MA signature length from node 302-1 or 302-2 (e.g., when node 302-1 or 302-2 is a parent node of wireless communication device 301).

Figure 3D:
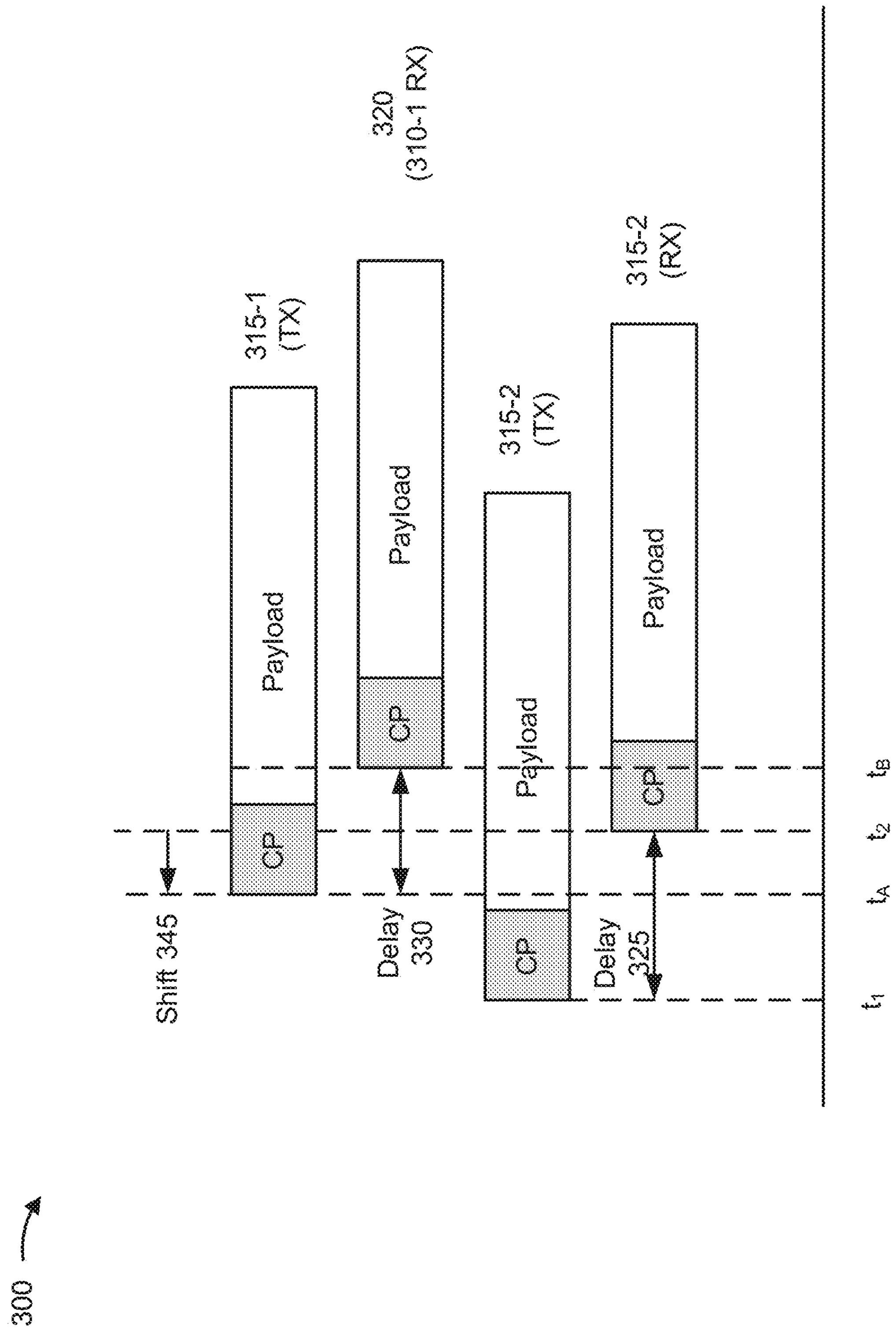

FIG. 3D shows an example of a timing alignment of the beams 310 after applying a timing adjustment (and, in some aspects, using MA signatures). In this case, second node 302-2 may transmit communication 315-2 at the first time $t_1$. Based at least in part on adjusting a timing of transmission of TX beams 310-1 by a shift 345, wireless communication device 301 transmits TX beams 310-1 at a time $t_A$, that is between the first time $t_1$ and the second time $t_2$ (e.g., $t_A$ is during delay 325). As a result, as shown, delay 330 (e.g., from transmission of communication 315-1 at time $t_A$ to an occurrence interfering transmission at time $t_B$) occurs during the adjusted cyclic prefix length portion of receiving communication 315-2. As a result, wireless communication device 301 may avoid inter-symbol interference and/or inter-carrier interference, and enables DMRS-based interference suppression and/or MMSE-IRC-based interference suppression.

As indicated above, FIGS. 3A-3D are provided as an example. Other examples may differ from what is described with respect to FIGS. 3A-3D.

Figure 4:
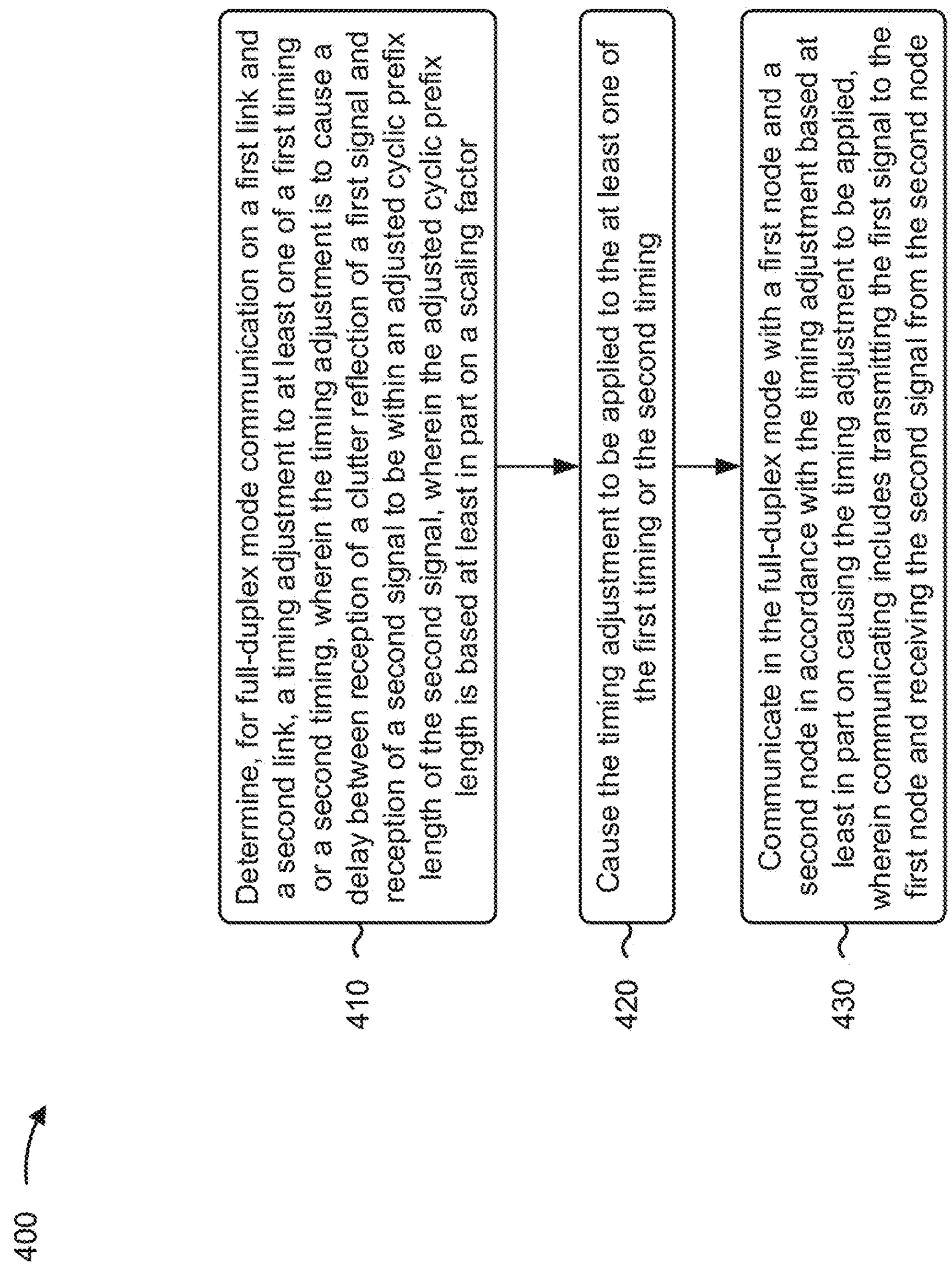
FIG. 4 is a diagram illustrating an example process performed, for example, by a wireless communication device, in accordance with various aspects of the present disclosure.

FIG. 4 is a diagram illustrating an example process 400 performed, for example, by a BS, in accordance with various aspects of the present disclosure. Example process 400 is an example where the wireless communication device (e.g., BS 110, UE 120, wireless communication device 301 and/or the like) performs operations associated with clutter interference mitigation.

As shown in FIG. 4, in some aspects, process 400 may include determining, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor (block 410). For example, the wireless communication device (e.g., controller/processor 240, controller/processor 280, and/or the like) determining, for full-duplex mode communication on a first link and a second link, a timing adjustment to at least one of a first timing or a second timing, as described above. In some aspects, the timing adjustment is to cause a delay between reception of a clutter reflection of a first signal and reception of a second signal to be within an adjusted cyclic prefix length of the second signal. In some aspects, the adjusted cyclic prefix length is based at least in part on a scaling factor.

As further shown in FIG. 4, in some aspects, process 400 may include causing the timing adjustment to be applied to the at least one of the first timing or the second timing (block 420). For example, the wireless communication device (e.g., controller/processor 240, transmit processor 220, TX MIMO processor 230, MOD 232, antenna 234, controller/processor 280, transmit processor 264, TX MIMO processor 266, MOD 254, antenna 252, and/or the like) may cause the timing adjustment to be applied to the at least one of the first timing or the second timing, as described above.

As further shown in FIG. 4, in some aspects, process 400 may include communicating in the full-duplex mode with a first node and a second node in accordance with the timing adjustment based at least in part on causing the timing adjustment to be applied, wherein communicating includes transmitting the first signal to the first node and receiving the second signal from the second node (block 430). For example, the wireless communication device (e.g., antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate in the full-duplex mode with a first node and a second node in accordance with the timing adjustment based at least in part on causing the timing adjustment to be applied, as described above. In some aspects, communicating includes transmitting the first signal to the first node and receiving the second signal from the second node.

Process 400 may include additional aspects, such as any single aspect or any combination of aspects described below and/or in connection with one or more other processes described elsewhere herein.

In a first aspect, causing the timing adjustment to be applied includes adjusting the first timing of the first signal.

In a second aspect, alone or in combination with the first aspect, causing the timing adjustment to be applied includes providing, to the second node, a timing advance command identifying the timing adjustment to cause a change to the second timing of the second signal.

In a third aspect, alone or in combination with one or more of the first and second aspects, the delay is entirely within the adjusted cyclic prefix length of the second signal.

In a fourth aspect, alone or in combination with one or more of the first through third aspects, the delay is at least partially within the adjusted cyclic prefix length of the second signal.

In a fifth aspect, alone or in combination with one or more of the first through fourth aspects, determining the timing adjustment includes determining the timing adjustment based at least in part on a clutter interference measurement of a reference signal or a synchronization signal block transmission to the first node.

In a sixth aspect, alone or in combination with one or more of the first through fifth aspects, determining the timing adjustment includes determining the timing adjustment based at least in part on a channel measurement of a reference signal or a synchronization signal from the second node.

In a seventh aspect, alone or in combination with one or more of the first through sixth aspects, communicating in the full-duplex mode includes communicating in the full-duplex mode based at least in part on a signal to interference noise requirement of at least one of the first link or the second link and based at least in part on a clutter interference leakage determination for the second signal.

In an eighth aspect, alone or in combination with one or more of the first through seventh aspects, process 400 includes reporting a time delay for the first node and the second node to a parent node of the wireless communication device and receiving an indication of whether to communicate in the full-duplex mode based at least in part on reporting the time delay, and communicating in the full-duplex mode includes communicating in the full-duplex mode based at least in part on receiving the indication of whether to communicate in the full-duplex mode.

In a ninth aspect, alone or in combination with one or more of the first through eighth aspects, process 400 includes determining a first multiple access (MA) signature for the first node and a second MA signature for the second node, wherein the first MA signature and the second MA signature are selected to suppress residual clutter interference, and communicating in the full-duplex mode includes communicating in the full-duplex mode with the first node using the first MA signature and with the second node using the second MA signature.

In a tenth aspect, alone or in combination with one or more of the first through ninth aspects, the scaling factor is less than or equal to one.

In an eleventh aspect, alone or in combination with one or more of the first through tenth aspects, the scaling factor is based at least in part on at least one of: a modulation of the second signal or a code rate of the second signal.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
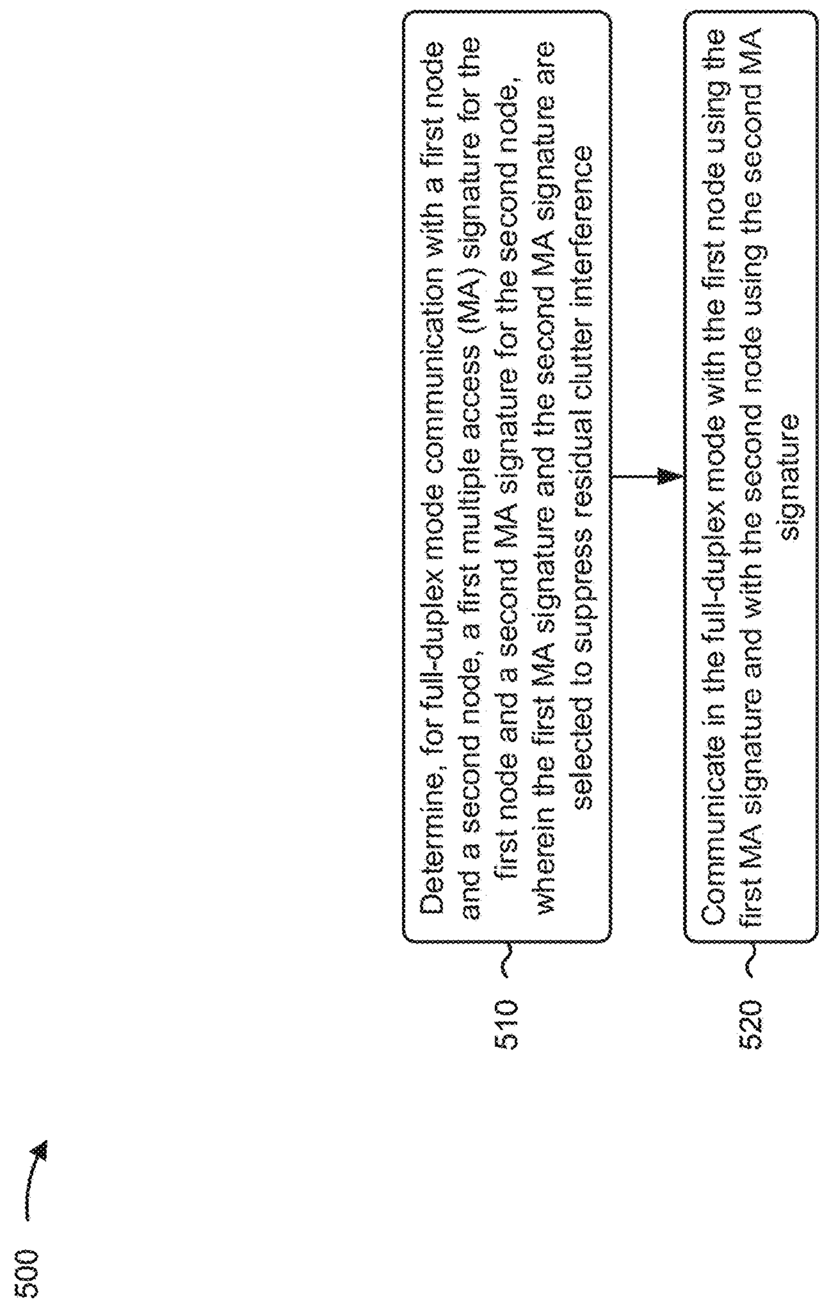
FIG. 5 is a diagram illustrating an example process performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example where the wireless communication device (e.g., BS 110, UE 120, wireless communication device 301, and/or the like) performs operations associated with clutter interference mitigation.

As shown in FIG. 5, in some aspects, process 500 may include determining, for full-duplex mode communication with a first node and a second node, a first multiple access (MA) signature for the first node and a second MA signature for the second node, wherein the first MA signature and the second MA signature are selected to suppress residual clutter interference (block 510). For example, the wireless communication device (e.g., controller/processor 240, controller/processor 280, and/or the like) may determine, for full-duplex mode communication with a first node and a second node, a first MA signature for the first node and a second MA signature for the second node, as described above. In some aspects, the first MA signature and the second MA signature are selected to suppress residual clutter interference.

As further shown in FIG. 5, in some aspects, process 500 may include communicating in the full-duplex mode with the first node using the first MA signature and with the second node using the second MA signature (block 520). For example, the wireless communication device (e.g., antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate in the full-duplex mode with the first node using the first MA signature and with the second node using the second MA signature, as described above.

Process 500 may include additional aspects, such as any single aspect or any combination of aspects described below and/or in connection with one or more other processes described elsewhere herein.

In a first aspect, a first demodulation reference signal (DMRS) configuration of a first signal transmitted to the first node and a second DMRS configuration of a second signal received from the second node are selected to enable separate channel estimation for the first signal and the second signal.

In a second aspect, alone or in combination with the first aspect, the first DMRS and the second DMRS use the same time resources, the same frequency resources, and the same base sequence.

In a third aspect, alone or in combination with one or more of the first and second aspects, the first DMRS and the second DMRS use the same time resources and the same frequency resources.

In a fourth aspect, alone or in combination with one or more of the first through third aspects, the first DMRS uses a first time resource and the second DMRS uses a second time resource.

In a fifth aspect, alone or in combination with one or more of the first through fourth aspects, the first DMRS uses a first frequency resource and the second DMRS uses a second frequency resource.

In a sixth aspect, alone or in combination with one or more of the first through fifth aspects, the first MA signature and the second MA signature are resource spread multiple access signatures.

In a seventh aspect, alone or in combination with one or more of the first through sixth aspects, lengths of the first MA signature and the second MA signature are selected based at least in part on at least one of a clutter interference level, a configured maximum signal to interference noise ratio, or a configured maximum throughput on a link to the second node.

In an eighth aspect, alone or in combination with one or more of the first through seventh aspects, process 500 includes transmitting information identifying a length of the first MA signature to the first node, and transmitting information identifying a length of the second MA signature to the second node.

In a ninth aspect, alone or in combination with one or more of the first through eighth aspects, process 500 includes transmitting information identifying a clutter interference measurement; and receiving, as a response to the information identifying the clutter interference measurement, information identifying at least one of a length of the first MA signature or a length of the second MA signature.

In a tenth aspect, alone or in combination with one or more of the first through ninth aspects, process 500 includes determining a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; causing the timing adjustment to be applied to the at least one of the first timing or the second timing; and communicating in the full-duplex mode with the first node and the second node in accordance with the timing adjustment based at least in part on causing the timing adjustment to be applied, wherein communicating includes transmitting the first signal to the first node and receiving the second signal from the second node.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a wireless communication device, comprising: determining, for full-duplex mode communication on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; causing the timing adjustment to be applied to the at least one of the first timing or the second timing; and communicating in the full-duplex mode with a first node and a second node in accordance with the timing adjustment based at least in part on causing the timing adjustment to be applied, wherein communicating includes transmitting the first signal to the first node and receiving the second signal from the second node.

Aspect 2: The method of aspect 1, wherein the scaling factor is less than or equal to one.

Aspect 3: The method of any of aspects 1 to 2, wherein the scaling factor is based at least in part on at least one of: a modulation of the second signal or a code rate of the second signal.

Aspect 4: The method of any of aspects 1 to 3, wherein causing the timing adjustment to be applied comprises: adjusting the first timing of the first signal.

Aspect 5: The method of any of aspects 1 to 4, wherein causing the timing adjustment to be applied comprises: providing, to the second node, a timing advance command identifying the timing adjustment to cause a change to the second timing of the second signal.

Aspect 6: The method of any of aspects 1 to 5, wherein the delay is entirely within the adjusted cyclic prefix length of the second signal.

Aspect 7: The method of any of aspects 1 to 6, wherein the delay is at least partially within the adjusted cyclic prefix length of the second signal.

Aspect 8: The method of any of aspects 1 to 7, wherein determining the timing adjustment comprises: determining the timing adjustment based at least in part on a clutter interference measurement of a reference signal or a synchronization signal block transmission to the first node.

Aspect 9: The method of any of aspects 1 to 8, wherein determining the timing adjustment comprises: determining the timing adjustment based at least in part on a channel measurement of a reference signal or a synchronization signal from the second node.

Aspect 10: The method of any of aspects 1 to 9, wherein communicating in the full-duplex mode comprises: communicating in the full-duplex mode based at least in part on a signal to interference noise requirement of at least one of the first link or the second link and based at least in part on a clutter interference leakage determination for the second signal.

Aspect 11: The method of any of aspects 1 to 10, further comprising: reporting a time delay for the first node and the second node to a parent node of the wireless communication device; and receiving an indication of whether to communicate in the full-duplex mode based at least in part on reporting the time delay; and wherein communicating in the full-duplex mode comprises: communicating in the full-duplex mode based at least in part on receiving the indication of whether to communicate in the full-duplex mode.

Aspect 12: The method of any of aspects 1 to 11, further comprising: determining a first multiple access (MA) signature for the first node and a second MA signature for the second node, wherein the first MA signature and the second MA signature are selected to suppress residual clutter interference; and wherein communicating in the full-duplex mode comprises: communicating in the full-duplex mode with the first node using the first MA signature and with the second node using the second MA signature.

Aspect 13: A method of wireless communication performed by a wireless communication device, comprising: determining, for full-duplex mode communication with a first node and a second node, a first multiple access (MA) signature for the first node and a second MA signature for the second node, wherein the first MA signature and the second MA signature are selected to suppress residual clutter interference; and communicating in the full-duplex mode with the first node using the first MA signature and with the second node using the second MA signature.

Aspect 14: The method of aspect 13, wherein a first demodulation reference signal (DMRS) configuration of a first signal transmitted to the first node and a second DMRS configuration of a second signal received from the second node are selected to enable separate channel estimation for the first signal and the second signal.

Aspect 15: The method of aspect 14, wherein the first DMRS and the second DMRS use the same time resources, the same frequency resources, and the same base sequence, and wherein the first DMRS uses a first cyclic shift and the second DMRS uses a second cyclic shift.

Aspect 16: The method of any of aspects 14 to 15, wherein the first DMRS and the second DMRS use the same time resources and the same frequency resources, and wherein the first DMRS uses a first base sequence and the second DMRS uses a second base sequence.

Aspect 17: The method of any of aspects 14 to 16, wherein the first DMRS uses a first time resource and the second DMRS uses a second time resource.

Aspect 18: The method of any of aspects 14 to 17, wherein the first DMRS uses a first frequency resource and the second DMRS uses a second frequency resource.

Aspect 19: The method of any of aspects 13 to 18, wherein the first MA signature and the second MA signature are resource spread multiple access signatures.

Aspect 20: The method of any of aspects 13 to 19, wherein lengths of the first MA signature and the second MA signature are selected based at least in part on at least one of: a clutter interference level, a configured maximum signal to interference noise ratio, or a configured maximum throughput on a link to the second node.

Aspect 21: The method of any of aspects 13 to 20, further comprising: transmitting information identifying a length of the first MA signature to the first node; and transmitting information identifying a length of the second MA signature to the second node.

Aspect 22: The method of any of aspects 13 to 21, further comprising: transmitting information identifying a clutter interference measurement; and receiving, as a response to the information identifying the clutter interference measurement, information identifying at least one of a length of the first MA signature or a length of the second MA signature.

Aspect 23: The method of any of aspects 13 to 22, further comprising: determining a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor; causing the timing adjustment to be applied to the at least one of the first timing or the second timing; and communicating in the full-duplex mode with the first node and the second node in accordance with the timing adjustment based at least in part on causing the timing adjustment to be applied, wherein communicating includes transmitting the first signal to the first node and receiving the second signal from the second node.

Aspect 24: An apparatus for wireless communication at a device, comprising a processor; memory coupled with the processor; and instructions stored in the memory and executable by the processor to cause the apparatus to perform the method of one or more aspects of aspects 1-12.

Aspect 25: A device for wireless communication, comprising a memory and one or more processors coupled to the memory, the memory and the one or more processors configured to perform the method of one or more aspects of aspects 1-12.

Aspect 26: An apparatus for wireless communication, comprising at least one means for performing the method of one or more aspects of aspects 1-12.

Aspect 27: A non-transitory computer-readable medium storing code for wireless communication, the code comprising instructions executable by a processor to perform the method of one or more aspects of aspects 1-12.

Aspect 28: A non-transitory computer-readable medium storing a set of instructions for wireless communication, the set of instructions comprising one or more instructions that, when executed by one or more processors of a device, cause the device to perform the method of one or more aspects of aspects 1-12.

Aspect 29: An apparatus for wireless communication at a device, comprising a processor; memory coupled with the processor; and instructions stored in the memory and executable by the processor to cause the apparatus to perform the method of one or more aspects of aspects 13-23.

Aspect 30: A device for wireless communication, comprising a memory and one or more processors coupled to the memory, the memory and the one or more processors configured to perform the method of one or more aspects of aspects 13-23.

Aspect 31: An apparatus for wireless communication, comprising at least one means for performing the method of one or more aspects of aspects 13-23.

Aspect 32: A non-transitory computer-readable medium storing code for wireless communication, the code comprising instructions executable by a processor to perform the method of one or more aspects of aspects 13-23.

Aspect 33: A non-transitory computer-readable medium storing a set of instructions for wireless communication, the set of instructions comprising one or more instructions that, when executed by one or more processors of a device, cause the device to perform the method of one or more aspects of aspects 13-23.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device for wireless communication, comprising:
- a memory; and
- one or more processors coupled to the memory, the one or more processors configured to:
  - determine, for a full-duplex mode communication, associated with a full-duplex mode, on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor;
  - cause the timing adjustment to be applied to the at least one of the first timing or the second timing; and
  - communicate in the full-duplex mode with a first node and a second node in accordance with the timing adjustment based at least in part on causing the timing adjustment to be applied, wherein the communicating includes transmitting the first signal to the first node and receiving the second signal from the second node.

2. The device of claim 1, wherein the scaling factor is less than or equal to one.

3. The device of claim 1, wherein the scaling factor is based at least in part on at least one of: a modulation of the second signal or a code rate of the second signal.

4. The device of claim 1, wherein the one or more processors, to cause the timing adjustment to be applied, are configured to:
- adjust the first timing of the first signal.

5. The device of claim 1, wherein the one or more processors, to cause the timing adjustment to be applied, are configured to:
- provide, to the second node, a timing advance command identifying the timing adjustment to cause a change to the second timing of the second signal.

6. The wireless communication device of claim 1, wherein the delay is entirely within the adjusted cyclic prefix length of the second signal.

7. The device of claim 1, wherein the delay is at least partially within the adjusted cyclic prefix length of the second signal.

8. The device of claim 1, wherein the one or more processors, to determine the timing adjustment, are configured to:

determine the timing adjustment based at least in part on a clutter interference measurement of a reference signal or a synchronization signal block transmission to the first node.

9. The device of claim 1, wherein the one or more processors, to determine the timing adjustment, are configured to:

determine the timing adjustment based at least in part on a channel measurement of a second reference signal or a second synchronization signal from the second node.

10. The device of claim 1, wherein the one or more processors, to communicate in the full-duplex mode, are configured to:

communicate in the full-duplex mode based at least in part on a signal to interference noise requirement of at least one of the first link or the second link and based at least in part on a clutter interference leakage determination for the second signal.

11. The device of claim 1, wherein the one or more processors are further configured to:

report a time delay for the first node and the second node to a parent node of the device; and receive an indication of whether to communicate in the full-duplex mode based at least in part on reporting the time delay;

wherein the one or more processors, to communicate in the full-duplex mode, are configured to:

communicate in the full-duplex mode based at least in part on receiving the indication of whether to communicate in the full-duplex mode.

12. The device of claim 1, wherein the one or more processors are further configured to:

determine a first multiple access (MA) signature for the first node and a second MA signature for the second node, wherein the first MA signature and the second MA signature are selected to suppress residual clutter interference, wherein the one or more processors, to communicate in the full-duplex mode, are configured to:

communicate in the full-duplex mode with the first node using the first MA signature and with the second node using the second MA signature.

13. A method of wireless communication performed by a device, comprising:

determining, for a full-duplex mode communication, associated with a full-duplex mode, on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor;

causing the timing adjustment to be applied to the at least one of the first timing or the second timing; and communicating in the full-duplex mode with a first node and a second node in accordance with the timing adjustment based at least in part on causing the timing adjustment to be applied, wherein the communicating includes transmitting the first signal to the first node and receiving the second signal from the second node.

14. The method of claim 13, wherein the scaling factor is less than or equal to one.

15. The method of claim 13, wherein the scaling factor is based at least in part on at least one of: a modulation of the second signal or a code rate of the second signal.

16. The method of claim 13, wherein causing the timing adjustment to be applied comprises:

adjusting the first timing of the first signal.

17. The method of claim 13, wherein causing the timing adjustment to be applied comprises:

providing, to the second node, a timing advance command identifying the timing adjustment to cause a change to the second timing of the second signal.

18. The method of claim 13, wherein the delay is entirely within the adjusted cyclic prefix length of the second signal.

19. The method of claim 13, wherein the delay is at least partially within the adjusted cyclic prefix length of the second signal.

20. The method of claim 13, wherein determining the timing adjustment comprises:

determining the timing adjustment based at least in part on a clutter interference measurement of a reference signal or a synchronization signal block transmission to the first node.

21. The method of claim 13, wherein determining the timing adjustment comprises:

determining the timing adjustment based at least in part on a channel measurement of a second reference signal or a second synchronization signal from the second node.

22. The method of claim 13, wherein the communicating comprises:

communicating in the full-duplex mode based at least in part on a signal to interference noise requirement of at least one of the first link or the second link and based at least in part on a clutter interference leakage determination for the second signal.

23. The method of claim 13, further comprising:

reporting a time delay for the first node and the second node to a parent node of the device; and receiving an indication of whether to communicate in the full-duplex mode based at least in part on reporting the time delay, wherein the communicating comprises:

communicating in the full-duplex mode based at least in part on receiving the indication of whether to communicate in the full-duplex mode.

24. The method of claim 13, further comprising:

determining a first multiple access (MA) signature for the first node and a second MA signature for the second node, wherein the first MA signature and the second MA signature are selected to suppress residual clutter interference, wherein the communicating comprises:

communicating in the full-duplex mode with the first node using the first MA signature and with the second node using the second MA signature.

25. A non-transitory computer-readable medium storing a set of instructions for wireless communication, the set of instructions comprising:

one or more instructions that, when executed by one or more processors of a device, cause the device to:

determine, for a full-duplex mode communication, associated with a full-duplex mode, on a first link and a second link, a timing adjustment to at least one of a first timing or a second timing, wherein the timing adjustment is to cause a delay between reception of a clutter reflection of a first signal and reception of a second signal to be within an adjusted cyclic prefix length of the second signal, wherein the adjusted cyclic prefix length is based at least in part on a scaling factor;

cause the timing adjustment to be applied to the at least one of the first timing or the second timing; and communicate in the full-duplex mode with a first node and a second node in accordance with the timing adjustment based at least in part on causing the timing adjustment to be applied, wherein the communicating includes transmitting the first signal to the first node and receiving the second signal from the second node.

26. The non-transitory computer-readable medium of claim 25, wherein at least one of:

the scaling factor is less than or equal to one, or the scaling factor is based at least in part on at least one of: a modulation of the second signal or a code rate of the second signal.

27. The non-transitory computer-readable medium of claim 25, wherein the one or more processors, to cause the timing adjustment to be applied, are configured to:

adjust the first timing of the first signal.

28. The non-transitory computer-readable medium of claim 21, wherein the one or more instructions, that cause the device to determine the timing adjustment, cause the device to:

determine the timing adjustment based at least in part on one or more of:

a clutter interference measurement of a reference signal or a synchronization signal block transmission to the first node, or a channel measurement of a second reference signal or a second synchronization signal from the second node.

29. The non-transitory computer-readable medium of claim 27, wherein the one or more instructions, that cause the device to communicate in the full-duplex mode, cause the device to:

communicate in the full-duplex mode based at least in part on a signal to interference noise requirement of at least one of the first link or the second link and based at least in part on a clutter interference leakage determination for the second signal.

30. The non-transitory computer-readable medium of claim 27, wherein the one or more instructions further cause the device to:

report a time delay for the first node and the second node to a parent node of the device; and receive an indication of whether to communicate in the full-duplex mode based at least in part on reporting the time delay, wherein the one or more instructions, that cause the device to communicate in the full-duplex mode, cause the device to:

communicate in the full-duplex mode based at least in part on receiving the indication of whether to communicate in the full-duplex mode.

* * * * *